United States Patent [19]

Nelle

[11] 4,273,447
[45] Jun. 16, 1981

[54] PIVOTABLE MOUNT FOR SCANNING UNIT

[75] Inventor: Gunther Nelle, Bergen, Fed. Rep. of Germany

[73] Assignee: Dr. Johannes Heidenhain GmbH, Traunreut, Fed. Rep. of Germany

[21] Appl. No.: 82,105

[22] Filed: Oct. 5, 1979

[30] Foreign Application Priority Data

Oct. 10, 1978 [DE] Fed. Rep. of Germany ....... 2844066

[51] Int. Cl.$^3$ ....................... G01B 11/14; G01B 11/04
[52] U.S. Cl. .................................... 356/373; 33/125 C
[58] Field of Search .............................. 356/373–374, 356/395; 250/239; 33/125 C

[56] References Cited

U.S. PATENT DOCUMENTS

| 2,596,752 | 5/1952 | Williams | 356/395 |
| 2,886,717 | 5/1975 | Williamson et al. | 356/395 |
| 3,584,228 | 6/1971 | Kenyon | 250/239 |
| 4,047,586 | 9/1977 | Dlugos | 356/374 |
| 4,184,262 | 1/1980 | Kolb et al. | 33/125 C |

FOREIGN PATENT DOCUMENTS 7506036  9/1975  Fed. Rep. of Germany.

Primary Examiner—William H. Punter
Attorney, Agent, or Firm—Hume, Clement, Brinks, Willian & Olds, Ltd.

[57] ABSTRACT

A scanning unit for a measuring instrument including a measuring scale is pivotably mounted to a mounting member by a strip of material which forms a solid hinge which permits the scanning unit to pivot with respect to the mounting member about an axis substantially perpendicular to the scale and maintains a substantially fixed spacing between the scanning unit and the scale.

9 Claims, 2 Drawing Figures

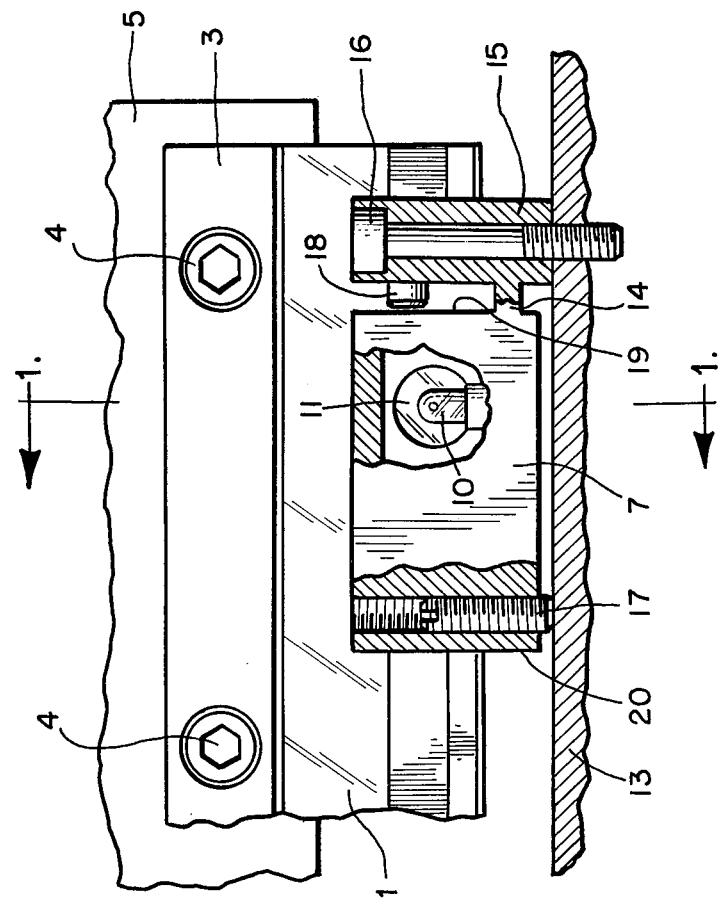
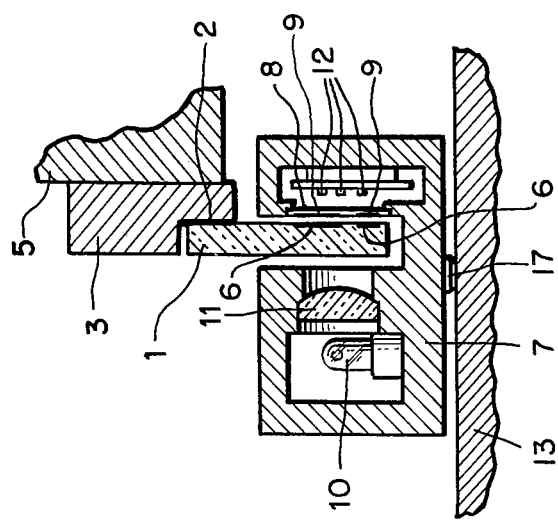

PIVOTABLE MOUNT FOR SCANNING UNIT

BACKGROUND OF THE INVENTION

This invention relates generally to length- or angle-measuring instruments for determining the relative displacement between two objects, in which a measuring scale that is connected with one object is scanned by a scanning unit connected to the other object. More particularly, this invention relates to such a scanning unit which is pivotably connected to a mounting member by means of a joint having an axis of rotation running perpendicular to the division plane of the measuring scale. Such measuring instruments are widely used for measuring relative movement between movable machine parts, for example, in machine tools or measuring machines.

In West German GM No. 75 06 036 there is described a digital length-measuring instrument in which a scanning unit, including a grid scanning plate, an illuminating system and photo-sensitive elements, is pivotably mounted to rotate about an axis running perpendicular to the division plane of a measuring scale. In this instrument, the pivotable mount includes a roller borne in V-grooves. After the scanning unit has been properly adjusted, it is fastened unshiftably to a mounting member by means of an adhesive. In order to adjust the position of the grid scanning plate with respect to the measuring scale, an adjusting screw is provided on each side of the axis of rotation of the scanning unit. This arrangement has the disadvantage that, during the adjustment of the grid scanning plate with respect to the measuring scale, the distance between the grid scanning plate and the measuring scale can change. This can degrade the performance of the measuring instrument, because diffraction and imaging considerations require that a precise separation be maintained between the grid scanning plate and the measuring scale.

SUMMARY OF THE INVENTION

The present invention is directed to length- or angle-measuring instruments of the above-mentioned type in which the spacing between the scanning plate and the measuring scale is held substantially constant as the angular position of the scanning unit is adjusted with respect to the measuring scale. According to this invention the scanning unit is pivotably connected to a mounting member by means of a bridging member which serves as a joint.

An important advantage of this invention is that the distance between the scanning plate of the scanning unit and the measuring scale is maintained substantially constant as the angular position of the scanning unit is adjusted. In this way, the scanning unit is simply and reliably held at the proper spacing from the measuring scale such that optimal electric signals are generated by the scanning unit for determining relative displacements. Further advantageous features of the invention are set forth in the dependent claims.

The invention, together with further features and attendant advantages, will be best understood by reference to the following detailed description taken in connection with the accompanying drawings.

BRIEF DESCRIPTION OF THE DRAWINGS

FIG. 1 is a cross-sectional view taken along line 1—1 of FIG. 2 of a length measuring instrument including a preferred embodiment of the scanning unit of the present invention.

FIG. 2 is a partial cutaway view of the length measuring instrument of FIG. 1.

DETAILED DESCRIPTION OF A PREFERRED EMBODIMENT

Referring now to the drawings, FIGS. 1 and 2 show two views of a length-measuring instrument in which a measuring scale 1 is fastened by means of an adhesive 2 to a carrier body 3, which in turn is connected by means of screws 4 to a slide piece 5 of a measuring machine.

The grid scale 6 of the measuring scale 1 is scanned by a scanning unit 7, including a scanning plate 8. The grid scale 6 of the measuring scale 1 and the grid scale 9 of the scanning plate 8 are illuminated by lighting system included in the scanning unit 7, which lighting system consists of a lamp 10 and a condenser 11. Light passing through the measuring scale 1 and the scanning plate 8 falls on photoelements 12 mounted in the scanning unit 7. The output signals of these photoelectric elements 12 are fed to an evaluating and display unit (not represented) for the determination and display of the relative movement between the slide piece 5 and a bed 13 of the measuring machine.

For the adjustment of the angular position of the grid scale 9 of the scanning plate 8 with respect to the grid scale 6 of the measuring scale 1, the scanning unit 7 is pivotably mounted to a mounting member 15 by means of a weakened section which forms a bridging member 14. This mounting member 15 is in turn fastened to the bed 13 of the measuring machine by means of a pair of screw connections 16. The bridging member 14 serves as a joint having an axis of rotation running perpendicular to the plane of the grid scale of the measuring scale 1. By pivoting the scanning unit 7 about this joint, the grid scale 9 of the scanning plate 8 can be precisely adjusted for either parallel alignment or Moire alignment with the grid scale 6 of the measuring scale 1.

The adjustment of the grid scale 9 of the scanning plate 8 with respect to the grid scale 6 of the measuring scale 1 is accomplished by an adjusting screw 17 arranged in the scanning unit 7, which adjusting screw 17 is located centrally on the end of the scanning unit 7 lying opposite the bridging member 14 and is supported on the bed 13 of the measuring machine. By means of the adjusting screw 17 the scanning unit 7 can be swung about the bridging member 14 as a joint into the desired position. This position is fixed additionally by a tightening screw 18, which is located in the mounting member 15 and abuts on a surface 19 of the scanning unit 7. When the screw 17 is retracted into the scanning unit 7, the scanning unit 7 abuts the bed 13 with an edge 20 resting on the bed 13 of the measuring machine.

The grid scale 9 of the scanning plate 8 can be adjusted with respect to the grid scale 6 of the measuring scale 8 in a manner (not shown) by other suitable adjusting means, such as, for example, an eccentric cam arrangement in place of the screw 17.

The scanning unit 7 and the mounting member 15 are preferably formed, together with the bridging member 14, from a single piece of a suitable material, such as, for example, plastic or metal.

A principal advantage of this invention is that the angular position of the grid scale 9 of the scanning plate 8 can be adjusted with respect to the grid scale 6 of the measuring scale 1 without altering the separation or the parallel spacing between the two grid scales 6,9. In this manner optimal electric signals for determining the relative position of machine parts, machine tools or measuring machines are obtained.

Of course, it should be understood that various changes and modifications to the preferred embodiment described above will be apparent to those skilled in the art. For example, the invention is well suited for use in Moire adjustment in photoelectric and optical systems as well as in parallel adjustment. Additionally, the invention can be used with inductive, magnetic and capacitive length- or angle-measuring instruments utilizing either incremental or absolute measuring techniques. Such changes and modifications can be made without departing from the spirit or scope of the present invention.

I claim:

1. In a measuring instrument for determining the relative displacement of a first object with respect to a second object, said instrument including a measuring scale mounted to the first object and a scanning unit for scanning the measuring scale, the improvement comprising:
   a mounting member mounted to a second object;
   an elastic bridging member interposed between and fixedly coupled to the mounting member and the scanning unit such that the bridging member forms a joint which permits the scanning unit to pivot with respect to the mounting member about an axis substantially perpendicular to the plane of the measuring scale but substantially prevents movement of the scanning unit in any direction inclined to the plane of the measuring scale and thus maintains a substantially constant spacing between the measuring scale and the scanning unit; and
   means for selectively adjusting the angular position of the scanning unit with respect to the mounting member and for selectively locking the scanning unit rigidly in place with respect to the mounting member.

2. The improvement of claim 1 wherein the scanning unit, the mounting member, and the bridging member are formed from a single piece of material and wherein the bridging member comprises a weaker section of the material.

3. In a measuring instrument for determining the relative displacement of a first object with respect to a second object, said instrument including a measuring scale mounted to the first object and a scanning unit for scanning the measuring scale, the improvement comprising:
   a mounting member mounted to the second object;
   a flexible strip of material interposed between and fixedly coupled to the mounting member and the scanning unit such that the strip forms a solid hinge which permits the scanning unit to pivot with respect to the mounting member about an axis substantially perpendicular to the plane of the measuring scale but substantially prevents movement of the scanning unit in any direction inclined to the plane of the measuring scale and thus maintains a substantially constant spacing between the measuring scale and the scanning unit; and
   means for selectively adjusting the angular position of the scanning unit with respect to the mounting member and for selectively locking the scanning unit rigidly in place with respect to the mounting member.

4. The improvement of claim 1 or 3 wherein the adjusting means includes at least one adjusting screw.

5. The improvement of claim 3 wherein the strip, at least a portion of the scanning unit, and the mounting member are all formed from a single piece of material and wherein the flexible strip comprises a thinner section of the material.

6. The improvement of claim 2 or 5 wherein the material is metal.

7. The improvement of claim 2 or 5 wherein the material is plastic.

8. The improvement of claim 1 or 3 wherein the means for adjusting and locking comprises two adjusting screws lying in the pivotal plane of the scanning unit and acting substantially perpendicularly to each other, one screw acting between the scanning unit and the mounting member and the other screw acting between the scanning unit and the second object.

9. In a measuring instrument for determining the relative displacement of a first object with respect to a second object, said instrument including a measuring scale mounted to the first object and a scanning unit for scanning the measuring scale, the improvement comprising:
   a mounting member rigidly mounted to a second object;
   a bendable strip formed in one piece with the mounting member and the scanning unit, the strip lying between the mounting member and the scanning unit in a plane perpendicular to the plane of the measuring scale, the strip coupling the mounting member to the scanning unit such that the scanning unit is pivotable with respect to the mounting member about an axis formed by the strip and such that the scanning unit is substantially prevented from moving in any direction inclined to the plane of the measuring scale, the bendable strip acting to maintain a substantially constant spacing between the measuring scale and the scanning unit; and
   first and second adjusting screws lying in a pivotal plane of the scanning unit, the two screws acting substantially perpendicularly to each other, the first screw acting between the scanning unit and the mounting member and the second screw acting between the scanning unit and the second object, such that the adjusting screws selectively adjust the angular position of the scanning unit with respect to the mounting member and selectively lock the scanning unit rigidly in place with respect to the mounting member, whereby the scanning unit is kept in adjustment between the two screws.

* * * * *